United States Patent [19]

Rees

[11] Patent Number: 4,807,579
[45] Date of Patent: Feb. 28, 1989

[54] TURBOCOMPOUNDED TWO-STROKE PISTON ENGINES

[76] Inventor: John A. J. Rees, 7 Hollies Close, Newton Solney, Burton-on-Trent, Staffordshire DE15 0SB, England

[21] Appl. No.: 104,059
[22] PCT Filed: Jan. 16, 1987
[86] PCT No.: PCT/GB87/00025
§ 371 Date: Sep. 16, 1987
§ 102(e) Date: Sep. 16, 1987
[87] PCT Pub. No.: WO87/04491
PCT Pub. Date: Jul. 30, 1987

[30] Foreign Application Priority Data

Jan. 16, 1986 [GB] United Kingdom ............. 8601065

[51] Int. Cl.⁴ ............................................. F02B 75/02
[52] U.S. Cl. ............................ 123/257; 123/65 VD
[58] Field of Search ................. 123/257, 48 D, 78 D, 123/65 VB, 65 VD, 65 BA, 281, 284, 286

[56] References Cited

U.S. PATENT DOCUMENTS

| | | | |
|---|---|---|---|
| 2,048,223 | 7/1936 | Scott | 123/257 |
| 2,280,839 | 4/1942 | Nallinger | 123/65 BA |
| 3,093,959 | 6/1963 | Birmann | |
| 3,113,561 | 12/1963 | Heintz | 123/257 |
| 3,270,722 | 9/1966 | Bernard | 123/257 |
| 4,036,187 | 7/1977 | Ting | 123/275 |
| 4,162,662 | 7/1979 | Melchior | 123/65 BA |
| 4,202,300 | 5/1980 | Skay | 123/48 D |
| 4,215,549 | 8/1980 | Daeschner . | |
| 4,449,370 | 5/1984 | Ream . | |

FOREIGN PATENT DOCUMENTS

| | | |
|---|---|---|
| 2401509 | 7/1975 | Fed. Rep. of Germany . |
| 0160050 | 9/1984 | Japan .................. 123/48 D |
| 357243 | 11/1961 | Switzerland . |
| 581784 | 9/1976 | Switzerland . |
| 992769 | 1/1983 | U.S.S.R. . |
| 372556 | 5/1932 | United Kingdom . |
| 704800 | 3/1954 | United Kingdom ............ 123/257 |
| 874902 | 8/1961 | United Kingdom . |

OTHER PUBLICATIONS

Some Unusual Engines (Book Extract)-L. J. K. Setright, 1/1975, Chapter 2, pp. 43-44.
AIAA-83-1338-Compound Cycle Turbofan Engine, J. G. Castor, Jun. 27-29, 1983.
NASA Technical Memorandum 88879, Technical Report 86-C-37, Compound Cycle Engine Program, Bobula et al. Nov. 12-14, 1986.
Hyperbar System of High Supercharging, Melchior et al, Society of Automotive Engineers, Inc., 740723, Sept. 9-12, 1974.

Primary Examiner—Charles J. Myhre
Assistant Examiner—David A. Okonsky
Attorney, Agent, or Firm—Cushman, Darby & Cushman

[57] ABSTRACT

The cylinder head (401) of a turbocompounded 2-stroke piston engine incorporates, for each cylinder (400), an indirect combustion chamber (402) which is connected to the cylinder clearance volume (413) by a passage (412). The indirect combustion chamber (402) incorporates the inlet valve (408) so that when the valve opens, turbocharging air flows into the cylinder through the chamber (402) and the passage (412). This allows a large proportion of the cylinder head area to be devoted to the exhaust valves (410), with advantages in good scavenging and maximizing mass flow rates through the cylinder.

9 Claims, 10 Drawing Sheets

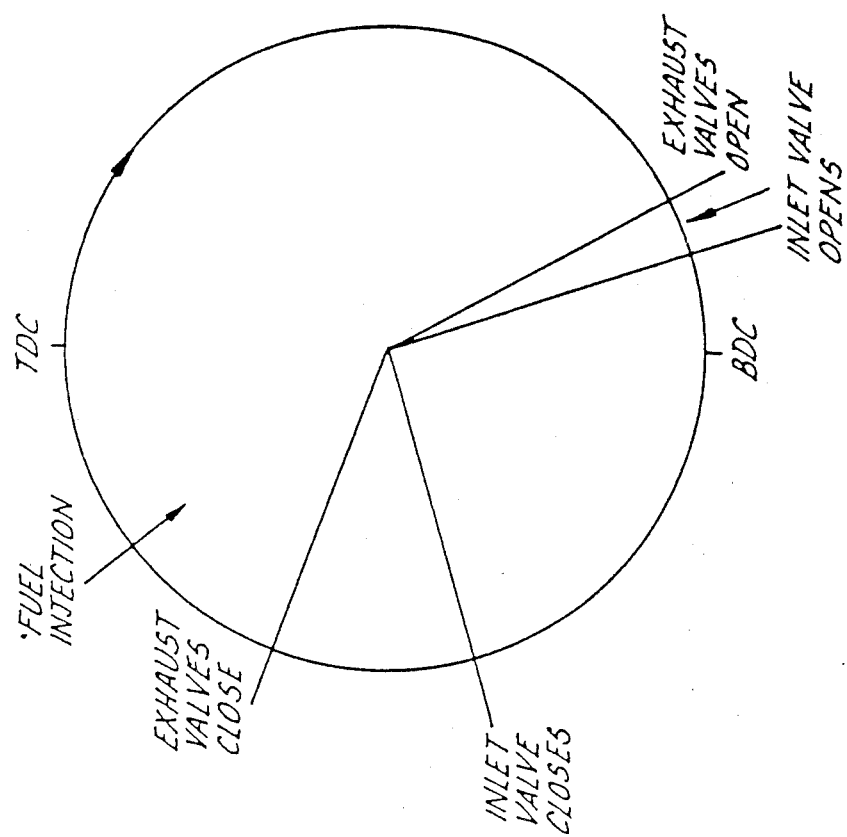
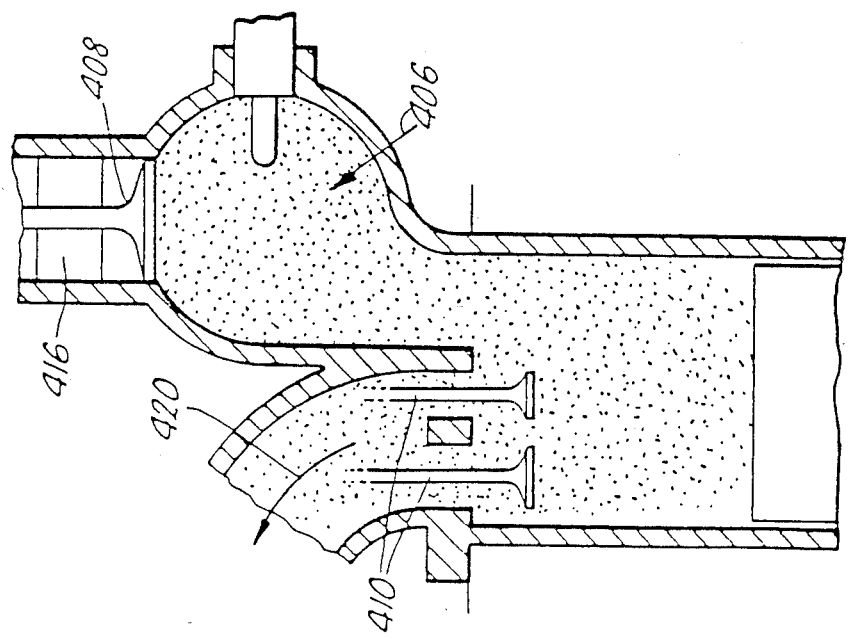

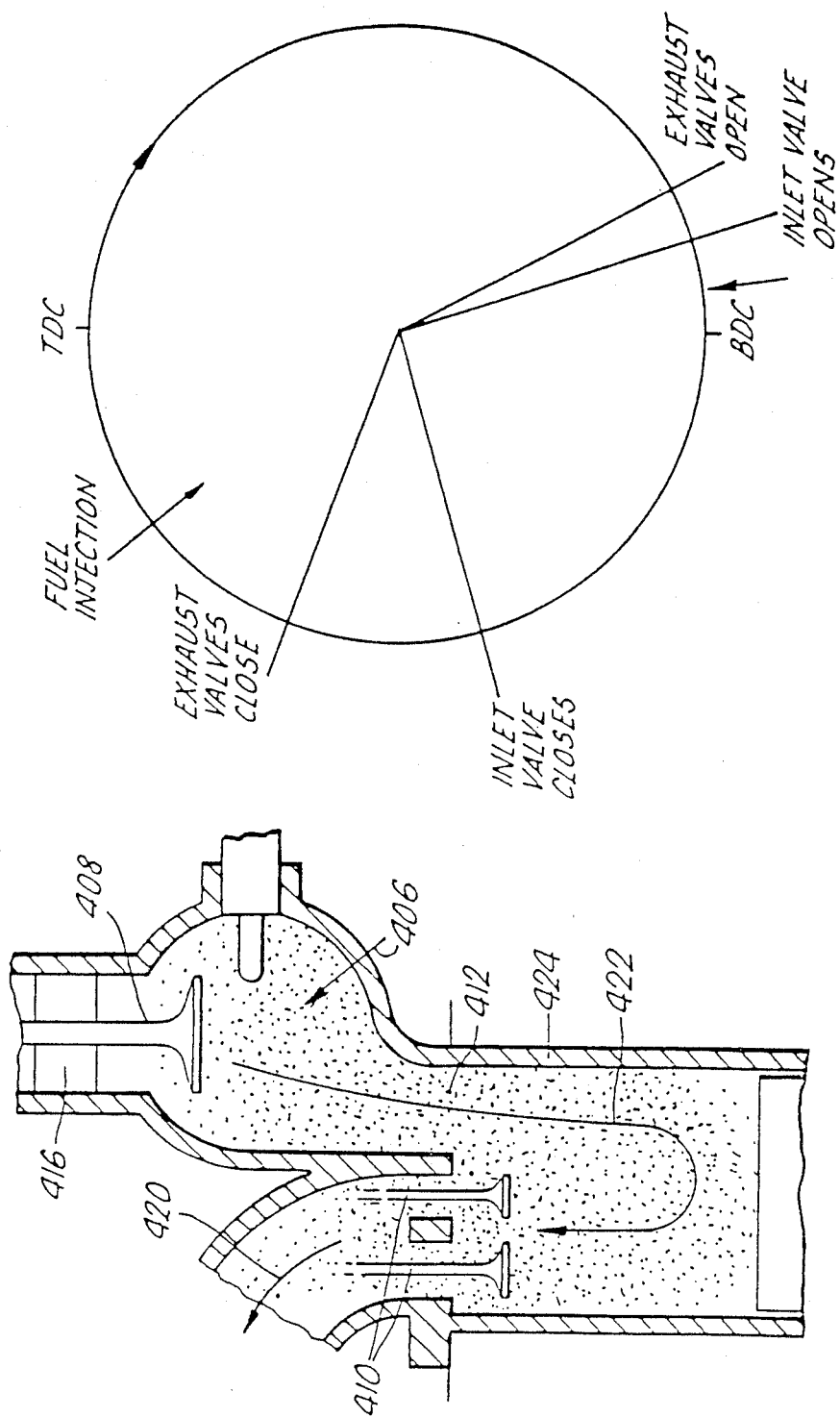

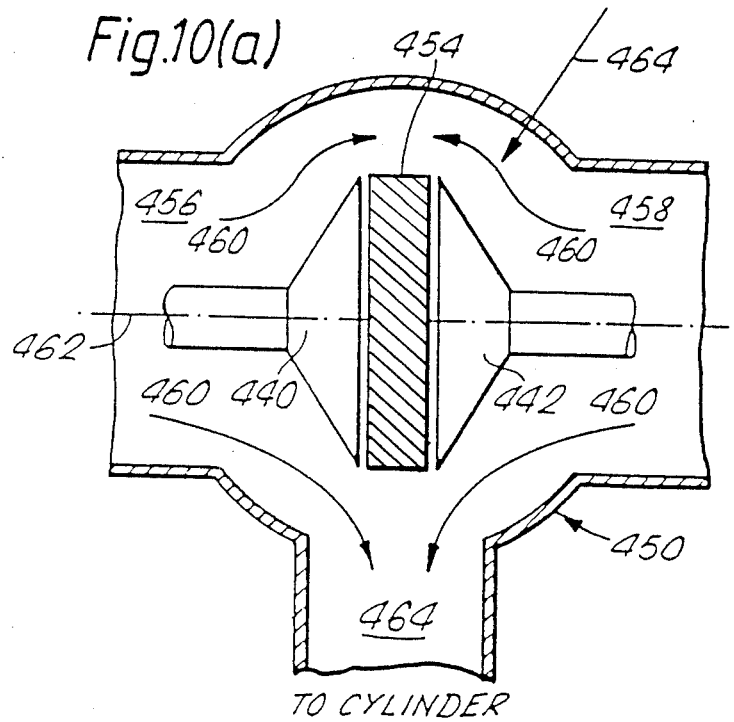
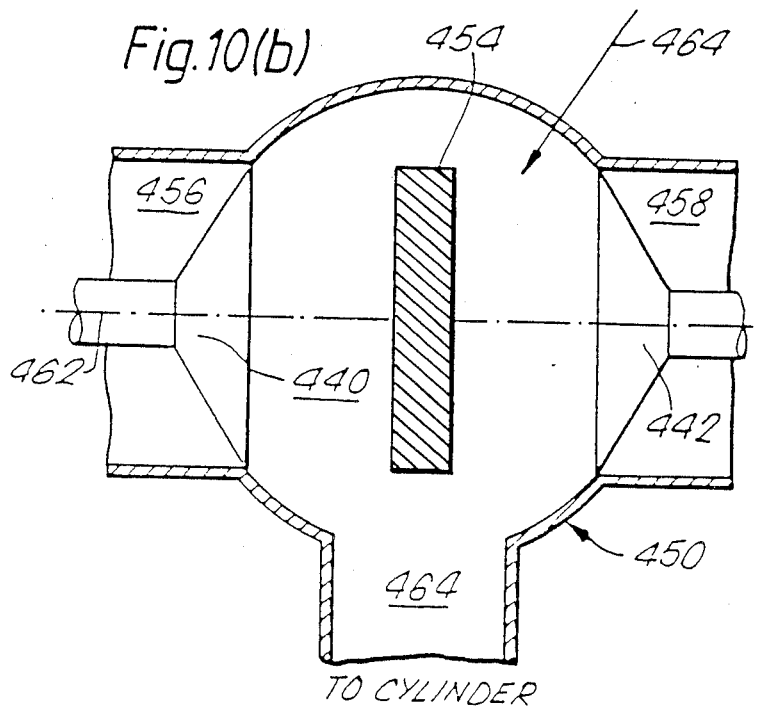

TURBOCOMPOUNDED TWO-STROKE PISTON ENGINES

This invention relates to turbocompounded 2-stroke piston engines and to improved cylinder head configurations for such engines.

By the term "turbocompounded 2-stroke piston engines" is meant a 2-stroke reciprocating piston engine adapted to be linked to a turbine-turbocompressor set so that the exhaust gases of the former drive, or help to drive, the turbine of the latter, which drives the turbocompressor, which in turn turbocharges the piston engine. The turbine/turbocompressor set may be part of a gas turbine engine capable of operating independently of the piston engine, or may operate merely as a turbocharger.

It has long been considered desirable to turbocharge piston engines operating on a 2-stroke cycle in order to maximise power output and fuel efficiency while minimising specific weight of the engine.

A good early example of this type of engine as applied to aircraft propulsion was the "Napier Nomad", described for example, in the magazine "Flight", vol. 65, no. 4, April 1954, pp. 543-551. It consisted of a turbocharged 12-cylinder, 2-stroke diesel with the turbine/turbocompressor set driven off the diesel's exhaust, the two parts of the engine being interconnected through a variable gear which allowed the two shaft speeds to be optimally matched over the flight regime of the aircraft in which it was installed. It was not commercially successful, apparently because it was heavier and more complex than equivalent turbojets; also, turbojets offered higher speeds, while fuel at the time was relatively cheap so that the higher fuel consumption of the turbojet was not very much of a penalty.

More recently, U.S. Pat. No. 4,449,370 discloses a compound engine for aircraft use in which a low compression turbocharged diesel engine has a turbocharger which can be operated independently of the diesel. This is possible because although the turbine receives the exhaust gases from the diesel, they first pass through a catalytic combustor inserted in the cycle before the turbine, so that whenever needed, fuel and air can be supplied to the catalytic combustor to provide additional heating of the exhaust gases; furthermore, a valve and ducting is provided so that the diesel engine can be selectively bypassed, the compressor (blower) air being passed straight to the catalytic combustion chamber to drive the turbine and hence provide power for auxiliary equipment during the starting sequence.

A survey of these and other proposed examples of turbocompounded 2-stroke piston engines seems to reveal that, though of varied type and construction, they follow convention for such engines in that the pressure at which the turbocharging air is delivered to the piston engine is lower than the pressure at which the combustion gases from the piston engine are exhausted to the turbine.

Furthermore, considering examples of 2-stroke piston engine operating cycles in the ordinary case where they are not turbocompounded, it can be observed that, as a general rule, their compression ratios are approximately the same as their expansion ratios. It appears to be a fact that this general rule has also been applied to them when they have been compounded with turbine/turbocompressor sets.

It is here contended that the facts mentioned in the above two paragraphs are disadvantageous because, for reasons which will be appreciated later, they result in the overall operating cycles of turbocompounded 2-stroke piston engines being less efficient and powerful than they could be.

It is an object of the present invention to provide turbocompounded 2-stroke piston engines which are adapted to utilise a more efficient and/or powerful operating cycle than hitherto.

Accordingly, the present invention provides a turbocompounded 2-stroke piston engine having a cylinder head incorporating, for each cylinder of said piston engine, an indirect combustion chamber, inlet valve means for admitting turbocharging air to the cylinder, and exhaust valve means for exhausting combustion gases from the cylinder, the piston engine being adapted to perform an operating cycle, comprising a compression stroke and an expansion stroke, in which the expansion stroke expands the combustion gases to a pressure lower than the incoming turbocharging air, and in which scavenging of the combustion gases from the cylinder is facilitated by arranging that both the inlet valve means and the exhaust valve means are open at the same time during an early part of the compression stroke so as to purge the cylinder with turbocharging air during said early part of the compression stroke, whereby the cylinder has a compression ratio which is substantially less than its expansion ratio; wherein the inlet valve means is incorporated in the indirect combustion chamber such that when the inlet valve means is open, the incoming turbocharging air flows through the indirect combustion chamber before entering the cylinder, the indirect combustion chamber being connected to the cylinder by passage means for directing the incoming turbocharging air towards the piston thereby to displace the combustion gases towards the exhaust valve means and maximise the efficiency of said scavenging. Among other advantages, this engine tends to have good scavenging of spent combustion products from the cylinders and allows the use of low compression ratios.

Preferably, the passage means for directing the turbocharging air towards the pistons occupy a smaller portion of the cylinder head area than the exhaust valve means, thereby facilitating the scavenging process.

To help the piston engine cope with high expansion ratios, the indirect combustion chamber may incorporate two inlet valves disposed oppositely to each other across the indirect combustion chamber such that inlet obturating portions of the valves move towards each other when the valves are opened. Preferably, a heat retaining mass for assisting combustion is situated intermediate the two inlet valves such that it is shielded from the flow of the incoming turbocharging air, when the valves are open, by the inlet obturating portions of the valves.

The indirect combustion chamber may also incorporate a moveable piston means in the wall thereof, whereby the compression ratio of the engine can be varied.

In another aspect, the invention also embraces cylinder heads for turbocompound 2-stroke piston engines.

It should be understood that the turbine and the turbocompressor with which the piston engine is compounded may be either of the radial flow type or of the axial flow type, according to which type can be made to perform its part of the overall operating cycle most efficiently.

A leading advantage of the concepts outlined above is that they provide a means of greatly increasing the air flow through a given size of 2-stroke piston engine—and hence the power produced—without necessarily generating high peak combustion pressures in the cylinders. Furthermore, the air charge can be made cleaner before combustion occurs than in prior such engines. The concepts are very suitable for use where the 2-stroke piston engine is a diesel engine, but could also be applied to both spark ignition engines and those fuelled by gas.

Embodiments of the invention will now be described, by way of example only, with reference to the accompanying drawings, in which.

Figure 2:
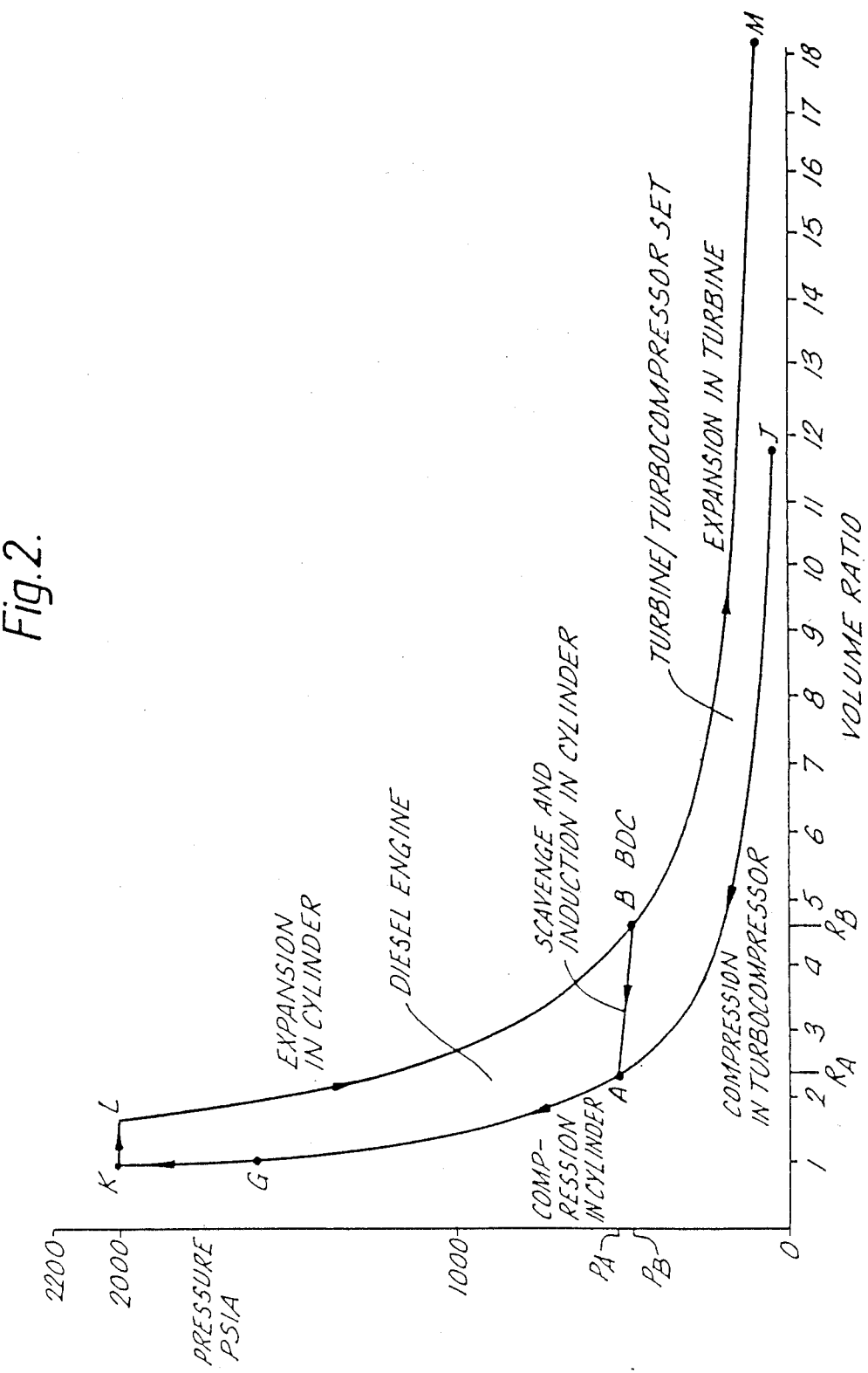
FIG. 2 is an indicator diagram showing the operational cycle of the piston engine of FIG. 1.
Figure 4:
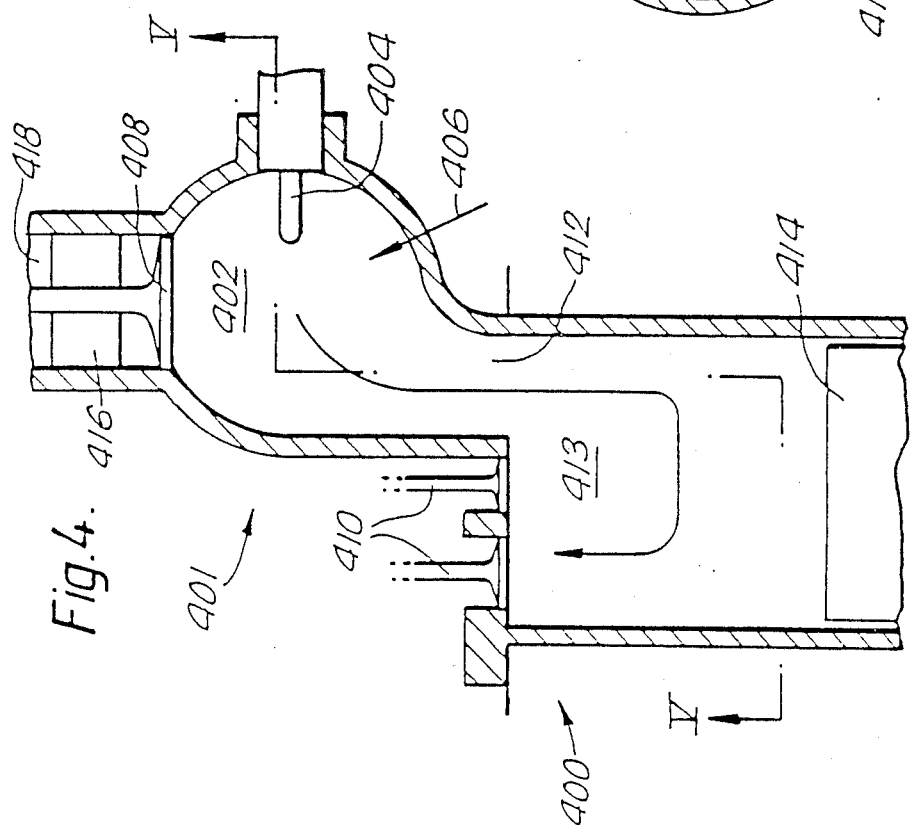
FIG. 4 is a schematic cross-sectional side elevation of a cylinder head configuration suitable for a 2-stroke piston engine performing the cycle shown in FIG. 2.
Figure 12:
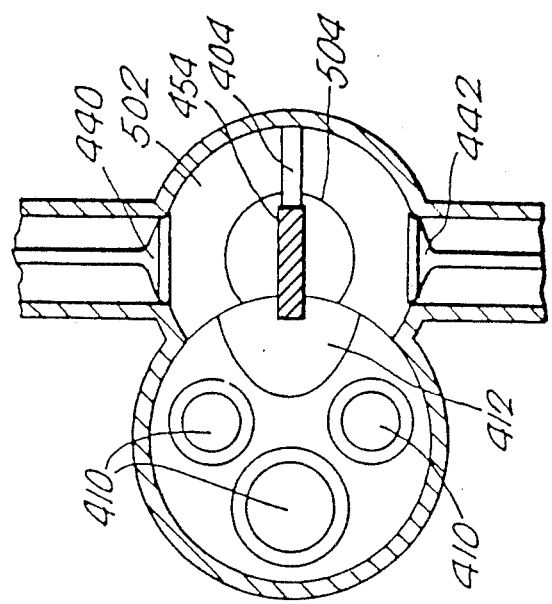
Figure 11:
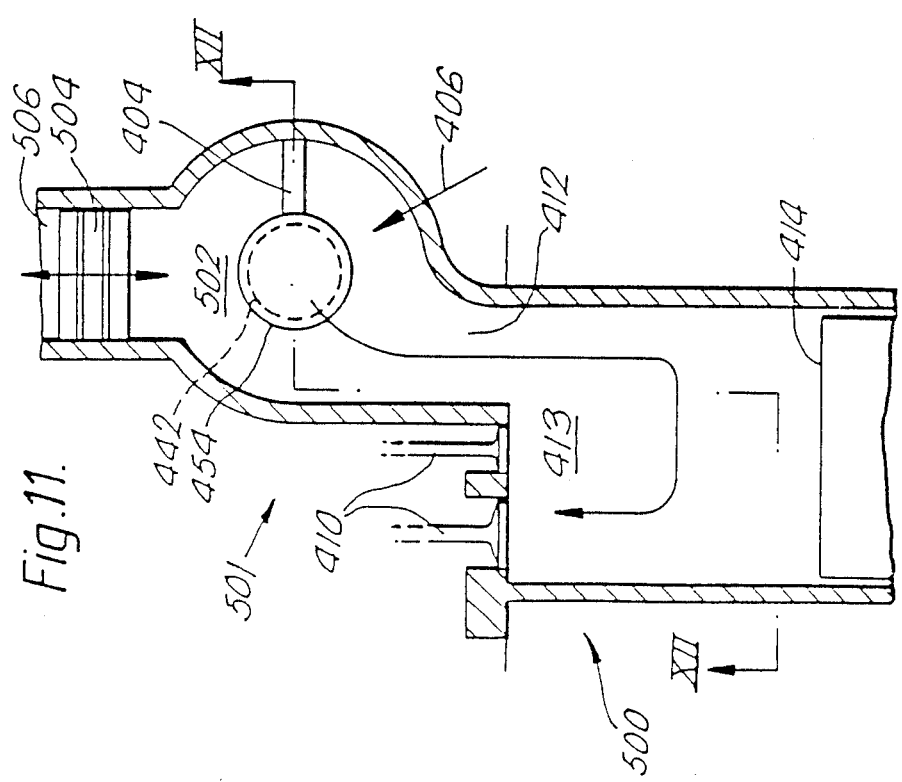

FIGS. 6(a) to 9(a) are views similar to FIG. 4 but showing the cylinder at successive stages in the scavenge and induction section of the cycle shown in FIG. 2;

FIGS. 6(b) to 9(b) are timing diagrams for the 2-stroke cycle at the successive stages of the cycle shown in corresponding FIGS. 6(a) to 9(a);

FIGS. 10(a) and 10(b) are diagrammatic cross-sectional elevations of an inlet valve arrangement alternative to that shown in FIG. 4, for use with engines having large expansion ratios;

FIG. 11 is a schematic cross-sectional side elevation of another alternative cylinder configuration similar to that of FIG. 4, but also incorporating the essential features of FIG. 10; and FIG. 12 is a view on section line XII—XII in FIG. 11.

Figure 1:
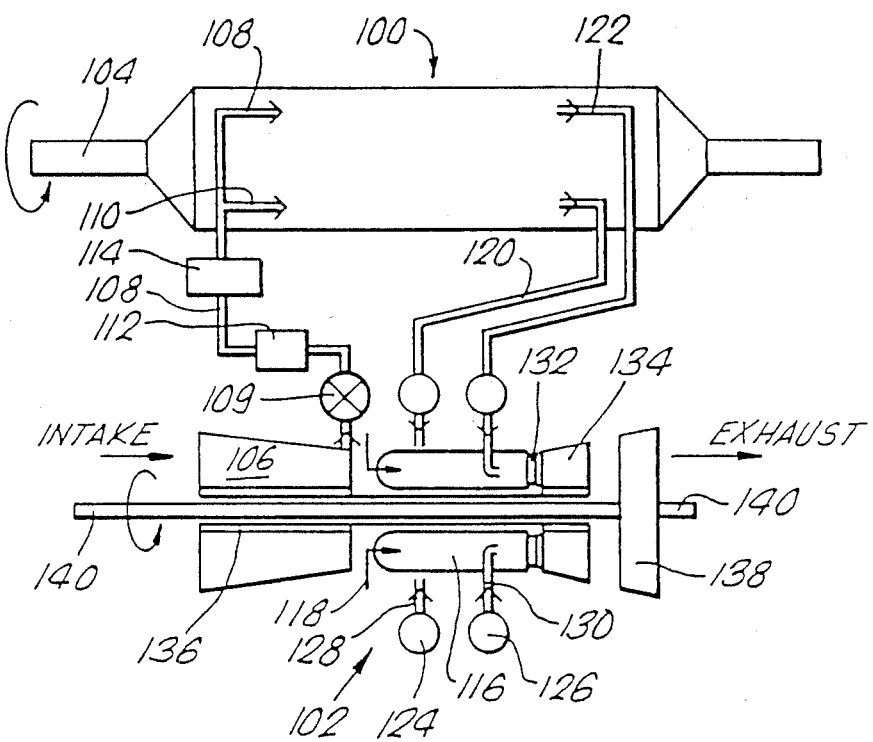
FIG. 1 is a schematic diagram of a compound engine comprising a gas turbine engine linked to a 2-stroke reciprocating piston engine.

Referring now to FIG. 1, there is shown, in schematic form, a compound engine comprising a multi-cylinder 2-stroke diesel engine 100 compounded with an atmospherically aspirated, twin spool, axial flow gas turbine engine 102 which is shown partly in axial cross-section. Both the diesel engine 100 and the gas turbine engine 102 may be derived from known types, but modified to the extent necessary to work the invention. As is normal, the pistons (not shown) are connected to a crankshaft (not shown) which drives a low speed output shaft 104. As will be explained later, the two engines are compounded together in such a way that their individual thermodynamic cycles are efficiently matched.

It will be seen from FIG. 1 that the turbocompounded diesel engine 100 is aspirated by turbocharging it from the output of the turbocompressor 106 of the gas turbine engine 102 through a turbocharger air duct 108. This air duct 108 incorporates an air valve 109 by means of which the air duct can be partially or completely obturated when required, as explained later, so as to reduce or prevent aspiration of the diesel engine 100.

In fact, the turbocharging air in air duct 108 is split two ways, one way being through a branch duct 110 for use as cooling air for cooling the cylinder head, cylinder liner and other components of the diesel engine 100, and the other way being through a continuation of duct 108 to aspirate the cylinders.

In order to adjust the temperature of the turbocharging air to an optimal valve for making the diesel engine semi-adiabatic, it is probably necessary to incorporate a heat exchanger 112 in duct 108. If cooling of the turbocharging air is required, the fluid with which the air exchanges heat could be the fuel supply to the gas turbine engine 102 and/or the diesel engine 100, or heat could be rejected to the atmosphere through a fan-assisted radiator. If warming of the turbocharging air is required, the heat exchange fluid could be exhaust air from the cooling system(s) of the diesel engine 100 and/or the gas turbine engine 102.

A beneficial effect of using turbocharging air to cool the cylinder components is that the extraction of heat (up to 30% of total heat liberated) means that less fuel is required in the gas turbine engine's combustion chamber. The gas turbine engine can therefore generate power at a significantly improved fuel comsumption, which could be similar to that of the diesel. The fuel consumption of the combined unit is thereby improved.

In addition to the heat exchanger 112, the turbocharging air supply duct 108 preferably includes a scavenge pump 114 in the form of a low pressure-ratio supercharger of known type which can be driven from the electrical system (not shown) of the compound engine, or preferably by a mechanical power offtake (not shown) from the diesel engine 100 or the gas turbine engine 102. The scavenge pump 114 may well be necessary in order to promote turbocharging air flow into and through the diesel engine 100 as required by the invention since the pressure difference between the outlet of the turbocompressor 106 and the exhaust outlet of the diesel engine may otherwise by insufficient to cause adequate circulation of the air through the cylinders and the cooling system.

Instead of being used for turbocharging, some (or if valve 109 is closed, all) of the air from the turbocompressor 106 is delivered directly to an annular combustion chamber 116 of the gas turbine engine 102, fuel being injected into the combustion chamber in known way by fuel injector nozzle 118 for burning with the turbocompressor delivery air. With air valve 109 partly or completely open, combustion occurs not only with the air from turbocompressor 106, but also with exhaust cooling air from the diesel's cooling system and with exhaust combustion gases from the diesel's exhaust ports.

Although air valve 109 is thought to be a necessary component of the compound engine for most purposes for which such an engine would be used, it would of course be preferably to do without it if possible for the sake of simplicity. This would depend upon the practicalities of the design in each case; for example, whether the diesel and gas turbine engines and their accessories were of such a design that both engines could be started simultaneously.

During design of the compound engine, it should also be considered whether the air valve 109, if present, should be progressive in its opening and closing action, as specified above, or alternatively be a simple two-position open/close valve. This choice will depend upon whether throttling of the turbocharging air supply to the diesel engine 100 is desirable during any part of its operating range.

Having exited the diesel engine 100 the exhaust cooling air and the exhaust combustion gases are conveyed to the gas turbine engine 102 by means of respective exhaust ducts 120 and 122. To ensure even distribution of both types of diesel exhaust around the annular combustion chamber 116, the exhaust ducts 120 and 122 discharge into respective annular distribution ducts 124,126 which surround the combustion chamber. From distribution duct 124, the diesel exhaust cooling air is passed through a number of equi-angularly spaced-apart distribution ports 128 to the region immediately surrounding the upstream end of the combustion chamber 116 so that it can gradually pass into the combustion chamber through air dilution holes (not shown) in the chamber wall, as known, to take part in the combustion process at a slightly later stage than the air coming direct from the outlet of the compressor 106. The diesel exhaust combustion gases in distribution duct 126, however, are passed through distribution ports 130 direct to a downstream interior region of the combustion chamber 116 so as to join the combustion process at a still later stage.

After passing through nozzle guide vane ring 132, the combustion gases exiting the gas turbine engine combustor 116 are expanded through a high pressure turbine 134, which extracts sufficient energy from the combustion gases to drive the turbocompressor 106, this being mounted on the same drive shaft 136 as the high pressure turbine. Finally, the gases are expanded through a free power turbine 138 to atmosphere. This is mounted on an output shaft 140 which runs inside shaft 136 and takes the output power to the forward end of the gtas turbine engine 102.

Taking an overall view of the compound engine shown in FIG. 1, the power outputs comprise a low speed output shaft 104 from the diesel engine 100, and a high speed output shaft 140 from the gas turbine engine 102. Mechanical, fluid or electrical coupling together of the two shafts may or may not be desirable, depending upon the power developed by the engines and the uses to which the power may be put. Such mechanical, fluid or electrical coupling is of course known in the art and so will not be described here in detail.

For example, in high power aeroengine applications, the powers developed may be too great for easy handling by gears or fluid couplings, so that it may be advantageous to use the output shaft 104 to drive a large relatively slow turning propeller or ducted fan, while using the output shaft 140 to drive smaller relatively fast turning propeller or ducted fan. In contrast, for a helicopter engine arrangement, the two output shafts 104,140 could be geared together to drive the main rotor through a modified form of helicopter reduction gear.

Starting of the two engines 100,102 relies on known technology. Thus, the gas turbine engine 102 could be started using a known type of electrical or air starter. If the diesel engine shaft 104 is not coupled to the gas turbine engine shaft 140, it would be necessary to utilise a conventional form of electrical or air starter motor for starting the diesel engine 100.

A suggested starting and operational sequence for the compound engine of FIG. 1 is as follows:

(a) The gas turbine engine 102 is started first and is run up to a suitable idling speed as an independent unit, the air valve 109 being closed, so that there is no air feed to the diesel engine 100.

(b) When the gas turbine engine 102 is self-sustaining and is developing some power, the diesel engine 100 is then started, using either a separate starter motor attached to shaft 104, or by driving it through a coupling between shafts 104 and 140. The air valve 109 is opened, scavenge pump 114 is started, and fuel is admitted to the diesel engine.

(c) As the diesel engine 100 accelerates into its normal running range, both the gas turbine engine 102 and the diesel engine continue running as separately fuelled units while cooperating synergistically as a compound engine, the gas turbine engine turbocharging the diesel engine and the diesel engine exhaust contributing to the power being developed by the gas turbine engine.

(d) During operation the amounts of power developed by each engine can be varied relative to each other to give optimum performance or efficiency. Since the supercharged diesel engine will be more fuel efficient than the gas turbine engine, it will, if possible, be advantageous to arrange that for periods when the total power output required from the compound engine is steady at moderate or low levels, most of the power is supplied by the diesel engine component, the gas turbine engine being throttled back or extinguished: in the latter case, it would function as a turbocharger but with some power produced by the power turbine. However, higher power levels could easily be supplied by arranging for the gas turbine engine to operate lit at a higher power level and thus supply a greater proportion of the total power of the compound engine.

It should be noted that the gas turbine engine 102 is preferably designed to operate at a high pressure ratio. Hence operation of the compound engine with the gas turbine engine lit, rather than operating unlit as a turbocharger, would not involve excessive fuel consumption.

The arrangement shown in FIG. 1 is capable of as much variation in design as other forms of turbocompounded unit and features such as further heat exchangers, re-generation and bottoming cycles could be included.

Referring now to FIG. 2, there is shown an idealised indicator diagram expressive of the overall operating cycle of the compound engine discussed in relation to FIG. 1, in which air and combustion gas pressures in pounds per square inch absolute are plotted as the ordinate against the corresponding volume ratios of the diesel engine and the gas turbine engine at various stages in the cycle.

The overall cycle may be described as follows:

(i) Air at atmospheric pressure enters the turbocompressor 106 (FIG. 1) at point J and is delivered as turbocharging air to the cylinders of the diesel engine 100 at point A with a turbocharging pressure $P_A$. Point A is a point during the first or compression stroke of the preferred 2-stroke cycle, after bottom dead centre.

(ii) Between points A and G the charge of air in the cylinder of the diesel engine is compressed as the piston travels up the cylinder towards top dead centre.

(iii) Combustion occurs at approximately constant volume between points G and K, and at approximately constant pressure between K and L.

(iv) From L to B expansion occurs in the cylinder as the piston travels back down the cylinder towards bottom dead centre at B, whereupon the combustion gases from the diesel are exhausted at a pressure $P_B$ to the turbine of the gas turbine engine and expansion is continued in the turbine back down to near atmospheric pressure at point M, which represents exhaust from the gas turbine engine.

(v) The sloping line B to A should be particularly noted, since in effect this represents the process of scavenging the spent combustion gases from the cylinder and the "induction" of the new charge of turbocharging air from compression in the next cycle, i.e. line BA indicates that "scavenging" and "induction" in the diesel engine must take place as the pistons move upwards from bottom dead centre during a first section of their compression strokes.

Further features of the compound engine of FIG. 1 will now be explained with reference to FIG. 2.

Firstly, the turbocharging air in duct 108 is delivered to the cylinders of the diesel engine 100 at a pressure $P_A$ which is higher than the pressure $P_B$ at which the combustion gases from the cylinders are exhausted to the turbine 134 through duct 122. As mentioned previously, this pressure drop across the diesel engine 100 helps promote adequate circulation of the turbocharging air through the cylinders of the diesel and may be ensured by incorporation of scavenge pump 114 in air duct 108. A further advantage is that because $P_A$ is not any less than $P_B$, explosive decompression does not occur when the inlet valves open. Previous practice of making $P_A$ less than $P_B$ has led to such decompression, resulting in unwanted mixing of the spent combustion gases with the new incoming air charge.

Secondly, the compression ratio $R_A$ of the diesel engine 100 is substantially less than its expansion ratio $R_B$, $R_A$ being approximately half the value of $R_B$. In fact the ideal theoretical relationship would appear to be $R_A = 0.5 \cdot R_B + 0.1$.

Thirdly, the fact that overall the complete indicator diagram in FIG. 2 is divided by the sloping line A-B, indicates good matching between the compression and expansion characteristics of the diesel engine 100 and the gas turbine 102 in that though the lower part of the diagram J-A-B-M is a typical gas turbine engine indicator diagram, the upper part A-G-K-L-B-A for the diesel engine breaks with convention in not having compression and expansion ratios approximately equal, i.e. its cycle has been altered to make it a better match for the gas turbine engine.

Figure 3:
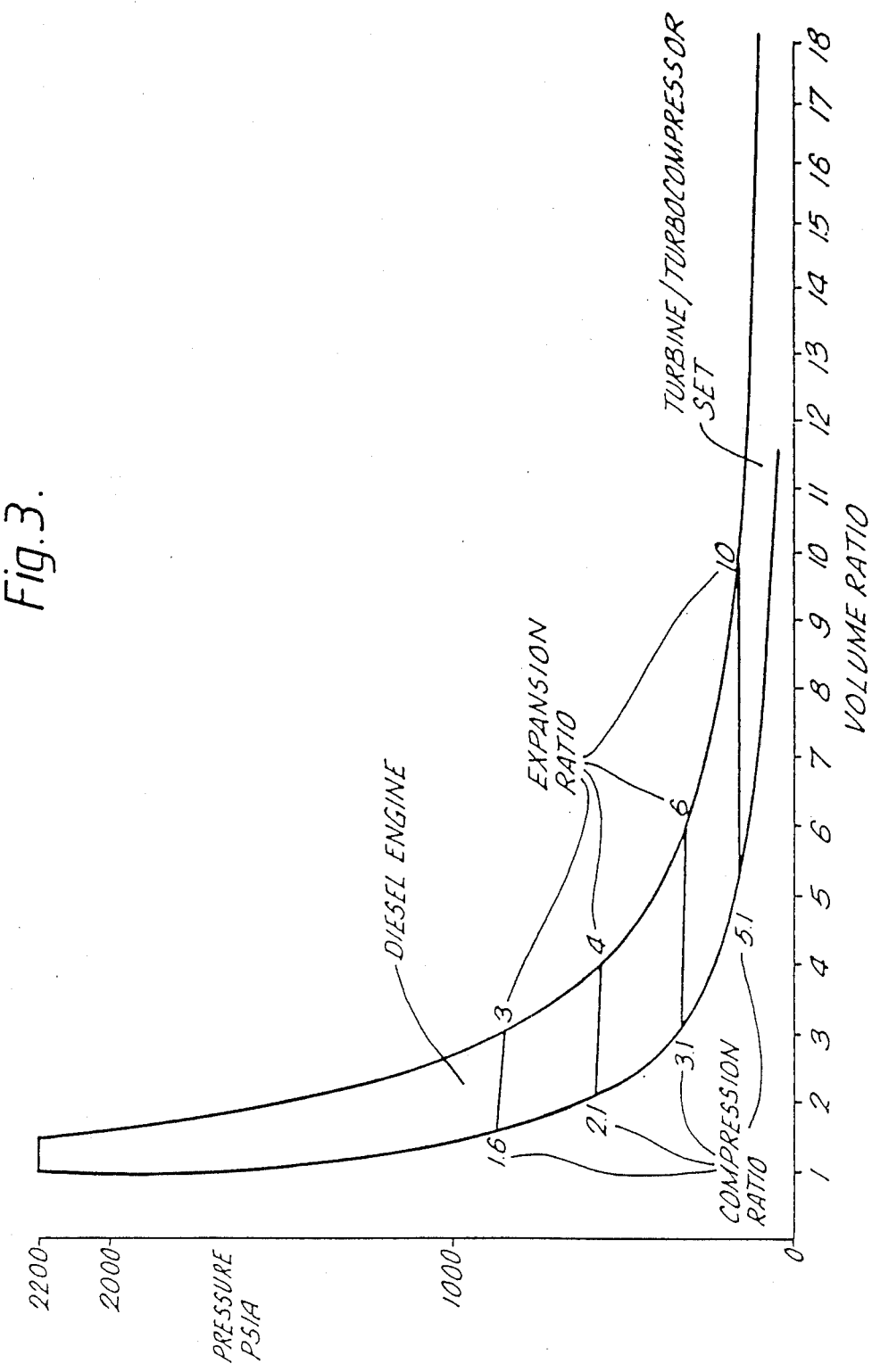
FIG. 3 is an indicator diagram like that of FIG. 2, but additionally showing possible ranges of compression and expansion ratios for the piston engine of FIG. 1.

An advantage of this almost horizontal division of the complete indicator diagram by the sloping line A-B is the design flexibility which it gives regarding the size relationship between the diesel engine and the gas turbine engine. Referring to FIG. 3, it will be seen that the sloping line A-B can be drawn at any level of turbocharging pressure without effecting either the theoretical area of the indicator diagram or the peak cylinder pressure, the compression and expansion ratios of the diesel engine bearing the same proportionate relationship to each other no matter what turbocharging pressure is adopted. Hence, as the line A-B moves upwards on the diagram, the size of diesel engine required to handle any given air flow through it is reduced, because the compression and expansion ratios of the diesel engine are reduced. It should be noted that power output from the diesel engine is a function of the pressure ratio of the turbocompressor—doubling the pressure ratio increases the power output by approximately two-thirds as much again—because the power produced in each cylinder depends mainly upon the mass of air contained in the cylinder clearance volume at top dead centre. Looking at FIG. 2, the compression ratio $R_A$ is defined as the volume V of the cylinder swept by the piston plus the unswept or clearance volume v of the cylinder, divided by the clearance volume, i.e.

$$R_A = (v+V)/V,$$

therefore $v = V/(R_A - 1)$, hence as the compression ratio is reduced to low values, the cylinder clearance volume becomes large. This relationship can be used advantageously by low compression ratio designs in accordance with our invention because use of a high pressure ratio turbocompressor enables the pressure and temperatures of the air retained in the cylinder at the top of the compression stroke to be at normal diesel values, even though large air mass flows are being processed and high powers produced. Alternatively, even higher powers are obtainable if use of advanced heat resistant materials in the pistons and cylinder head, such as superalloys and high-strength ceramics, allows increases in peak cylinder pressure and temperature. In these ways, more of the compression and expansion is carried but in the gas turbine engine and correspondingly less in the diesel engine.

FIG. 3 gives some indication of likely practicable overall ranges for compression and expansion ratios of the 2-stroke diesel of FIG. 1. Overall, the value of the expansion ratio is unlikely to be outside the range 3 to 12 inclusive, and for operation at sea level and normal land altitudes a preferred range for expansion ratio would be 3 to 8 inclusive. At high altitudes (say, 20,000 to 40,000 feet, the compound engine being a powerplant in a transport aircraft) a preferred range for expansion ratio would be 6 to 12 inclusive. Although these ranges are preferred as practicable design parameters for the diesel engine and the gas turbine engine with which it is compounded (the pressure ratios of the turbocompressor and turbine being chosen to match the compression ratio and expansion ratio of the diesel engine as mentioned previously), the advantages of giving the diesel engine as low a compression ratio as possible should be borne in mind. It should be noted that the diesel engine could incorporate a variable compression ratio cylinder head. This would be capable of varying the compression ratio by approximately 50%.

Figure 5:
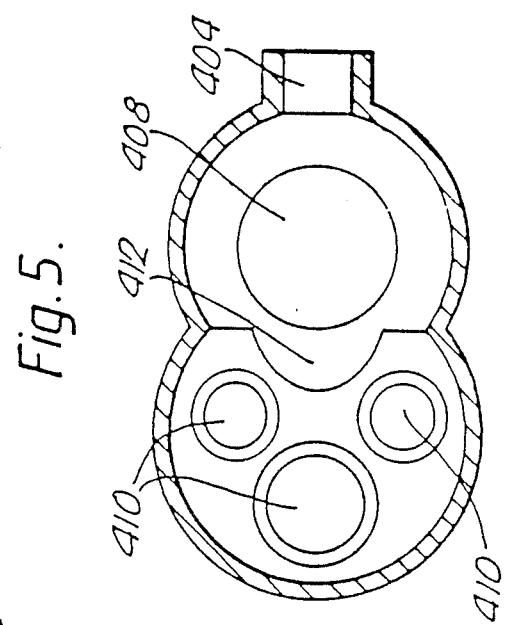
FIG. 5 is a view on section line V—V in FIG. 4.

Turning now to FIGS. 4 and 5, there is shown, respectively, a cross-sectional side elevation and a view on section line V—V of part of a cylinder 400 with a cylinder head configuration which can be incorporated in piston engine 100 of FIG. 1 and which is particularly suited to the proposed 2-stroke cycle of the invention. The cylinder head 401 incorporates an indirect combustion chamber 402 which is provided with a heater 404 (known in itself) for aiding combustion and a fuel injector 406, the latter component being conventional and indicated only by an arrow. Indirect combustion chambers, swirl chambers or atomisers are already used in a wide variety of reciprocating piston engines, but use is confined to the smaller sizes of engine. Advantages ascribed to the use of indirect combustion chambers are the ability to use higher fuel/air ratios, the ability to use simple "single-hole" fuel injectors, the ability to use fuels having poor ignition characteristics, and the ability to utilise high peak combustion pressures. The penalty set against these advantages is an increase in pumping losses.

However, when an indirect combustion chamber configuration is utilised in conjunction with the proposed 2-stroke cycle, certain further advantages can be made to accrue. These are connected with the fact that according to the cycle, the combustion gases are exhausted from the cylinders to the turbine at a lower pressure than that at which the turbocharging air is delivered to the cylinders, and that the compression ratio of the cylinders is preferably about half the expansion ratio. As previously noted with respect to FIG. 2, this makes the 2-stroke piston engine cycle a good fit on top of that of a high pressure ratio turbine/turbocompressor set such as might be derived from an aero-type gas turbine engine, and enables the expansion ratio, but particularly the compression ratio, of the piston engine to be minimised. This enables the indirect combustion chamber to be made large enough, as in FIGS. 4 and 5, for a large diameter inlet valve 408 to be fitted to it, the remainder of the cylinder head area being used for exhaust valves 410 to provide a large valve area. This is advantageous in maximising the mass flow rates of turbocharging air and combustion gases through the cylinders and hence increasing the power.

Again, it will be understood by the person skilled in the art that because the proposed cycle minimises the compression ratio of the piston engine, a smaller volume of turbocharging air is introduced into the cylinder before compression as such commences, i.e. the fresh charge of air at turbocharging pressure only occupies a fraction of the total volume of the cylinder. In the prior art, however, the compression and expansion ratios are more nearly equal and the cylinder must therefore be completely filled with turbocharging air. Since the incoming air charge is partly used to scavenge the combustion gases from the cylinder, it will be apparent that the proposed cycle might well be used to minimise wastage of turbocharging air in the scavenging process, and the configuration shown in FIGS. 4 and 5 helps to realise this possibility.

Thus, the fact that the cycle enables the inlet valve 408 to be incorporated in a large indirect combustion chamber 402, allows the passage 412, which connects the indirect combustion chamber 402 to the clearance volume 413 at the top of the cylinder 400, to be used to direct the incoming turbocharging air (perhaps at a small angle) towards the piston crown 414. The inclusion of inlet air straightening vanes 416 in the inlet passage 418 behind the inlet valve 408 also helps to direct the incoming air. In this way a "bubble" of clean turbocharging air is positioned on the crown of the piston 414 during an early part of the compression stroke and is maintained with minimum mixing with the combustion gases while the upward movement of the piston pushes the exhaust gas out through the exhaust valves 410. The upward acceleration of the piston at this stage will probably be of assistance in preferentially retaining the denser cooler turbocharging air in the region of the piston crown. Hence, wastage of the turbocharging air in the "purging" process is minimised.

The operation cycle of the cylinder configuration shown in FIGS. 4 and 5 will now be described in more detail with reference to FIGS. 6 to 9 which illustrate successive stages in the cycle. FIG. 2 should also be consulted. It should be noted that for descriptive purposes, the compression stroke is divided into a first (or early) section and a second (or last) section, the first section being subdivided by reference to an initial portion thereof.

FIG. 6(a) shows the piston 414 within cylinder 400 at a position near Bottom Dead Centre (BDC) near the end of the expansion stroke. The position on the timing diagram of FIG. 6(b) is indicated by the large arrow near the bottom. The exhaust valves 410 have just opened, and the inlet valve 408 is just about to open, before BDC is reached. A small amount of combustion gas 420 is already being exhausted to the turbine.

FIGS. 7(a) and 7(b) show the piston just before BDC, with both the inlet valve 408 and the exhaust valves 410 open. This position corresponds approximately to point B on FIG. 2. Clean turbocharging air 422 now enters the cylinder and is directed down the cylinder wall 424 (perhaps at a small angle to give some swirl around the cylinder) by the passage 412 to form a "bubble" of clean air on the piston crown. At this point the piston is almost stationary and the incoming turbocharging air 422 displaces some of the combustion gases 420 out of the cylinder through the exhaust valves 410, thus initiating active scavenging or purging of the cylinder.

Figure 8B:
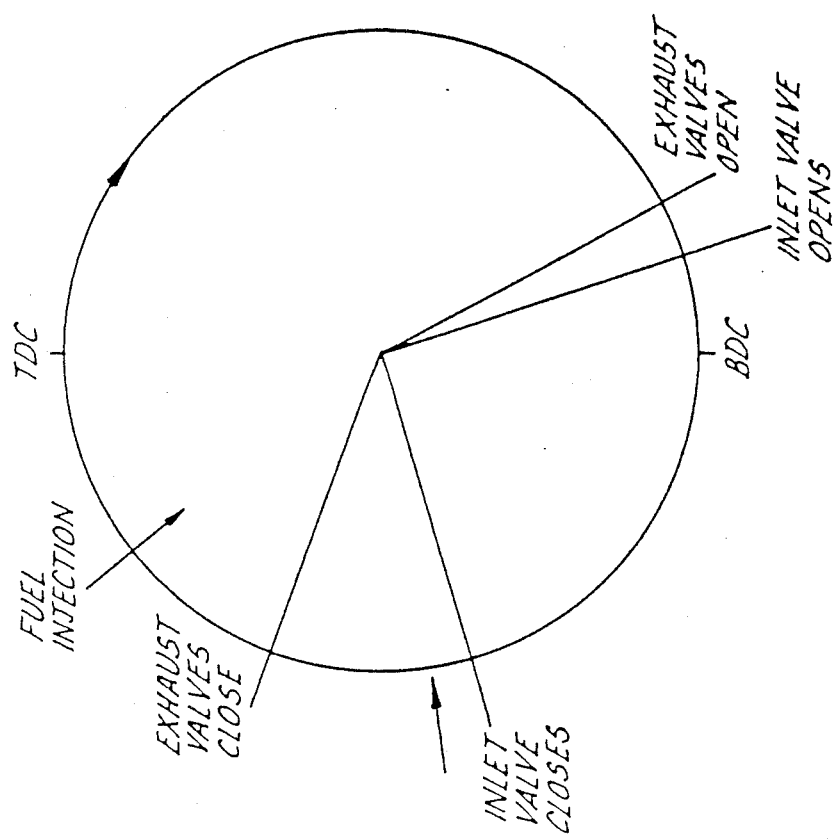
Figure 8A:
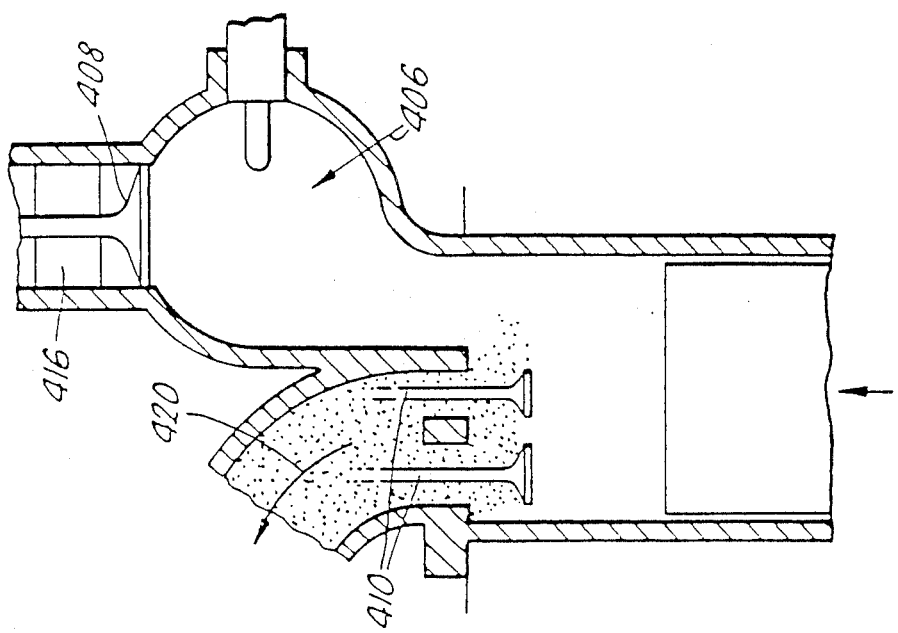

Both the inlet valve 408 and the exhaust valves 410 remain open while the piston moves upwards from BDC during the above-mentioned initial portion of the first or early section of the first or compression stroke of the cycle. This initial portion of the first section of the upward stroke ends when the inlet valve 408 closes somewhat before half-stroke. FIGS. 8(a) and 8(b) show the piston at a position just before half-stroke, but after shutting of the inlet valve. Active purging by flow-through of the turbocharging air ceases when the inlet valve closes, the upward motion of the piston having helped the "bubble" of relatively clean turbocharging air on top of the piston to push the combustion gases out through the exhaust valves 410.

It is preferred that the exhaust valves 410 stay open for a little while longer than the inlet valve 408 to ensure that the cylinder is further scavenged clear of combustion gases. At this stage the combustion gases remaining in the cylinder are concentrated near the exhaust valves and the further upward motion of the piston before the exhaust valves close pushes the combustion gases out of the cylinder.

Figure 9B:
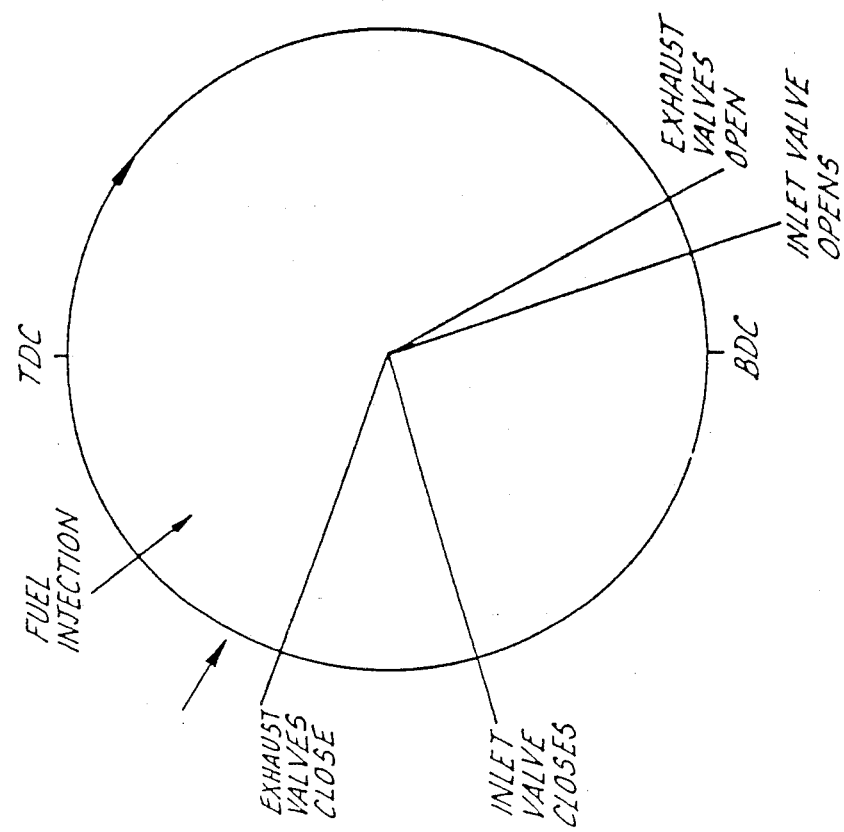
Figure 9A:
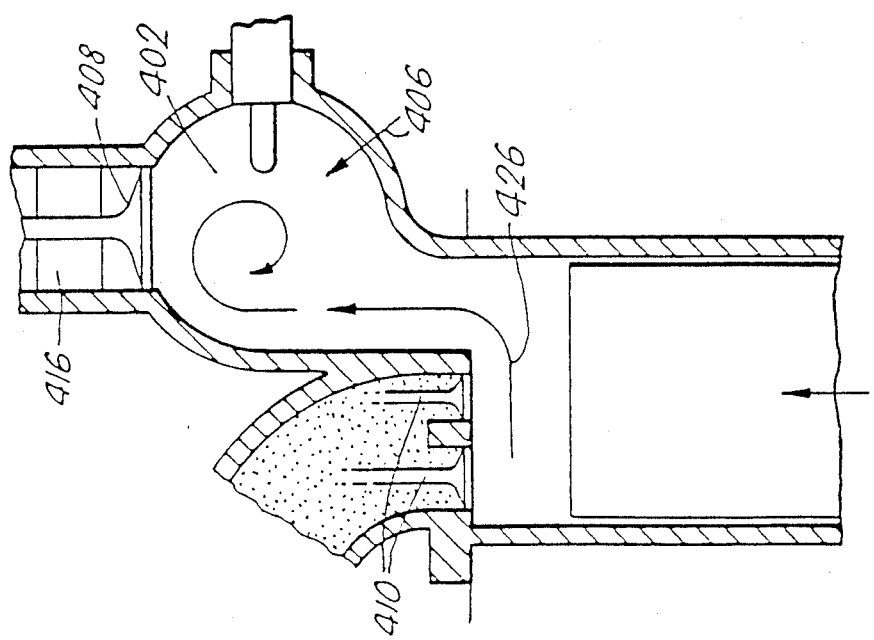

It is preferred that the exhaust valves 410 finally close at a little after half stroke, and FIGS. 9(a) and 9(b) show the situation somewhat after half-stroke, just after the exhaust valves 410 have closed. Closure of the exhaust valves 410 marks the end of the first or early section of the upward stroke and the beginning of the second or last section, during which compression of the turbocharging air above turbocharging pressure occurs. This position can be identified with point A in FIG. 2.

As shown in FIG. 9(a), during the second section of the compression stroke, the air charge 426 is pushed back into the indirect combustion chamber 402, fuel being injected into the chamber 402 through fuel injector 406 at a point in the second section of the compression stroke somewhat before Top Dead Centre (TDC). Combustion occurs as the piston passes through TDC, which may be identified approximately with point G in FIG. 2.

The whole of the second or downward stroke of the cycle is used for expansion, from TDC back down to BDC, when the cycle repeats.

To summarise, therefore, scavenging of the spent combustion gases, including purging with turbocharging air, plus of course induction by turbocharging, are all carried out during the first section of the piston's upward or compressive stroke between points B and A on FIG. 2. Note however that both these processes also overlap the end of the expansion stroke slightly in the present example.

It will be clear from FIGS. 6 to 9 why the compression ratio of the diesel engine is much less than the expansion ratio—it is of course because the scavenge and induction process occurs during the compressive stroke of the cycle, before actual compression begins.

Although at present it seem preferable to divide the first or early section of the compression stroke into an initial portion, during which both induction and purging by turbocharging air occur, and a final portion, during which further scavenging occurs whilst turbocharging pressure is maintained in the cylinder by the upward motion of the piston even though the inlet valve has been shut, it may in the light of experimental experience or further theoretical consideration be found more desirable to adjust the valve timing so that the inlet valve closes at the same time as—or even later than—the exhaust valve.

It is believed that the cylinder head configuration described with reference to FIGS. 4 to 9 is suitable for use when the cylinder's expansion ratio is less than about 8. To accommodate greater expansion ratios, a still larger inlet valve area is required, and this object may be achieved by the arrangement shown in FIGS. 10(a) and 10(b), which shows a view of an indirect combustion chamber taken on a section parallel with the longitudinal axis of the cylinder. FIG. 10(a) shows inlet valves 440,442, open and FIG. 10(b) shows them shut. The indirect combustion chamber 450 houses a so-called "hot mass" 454 (known in itself) whose purpose is to assist the combustion process and extend the operational envelope of the engine by retaining heat from the previous cycle. In this way combustion can still proceed in the indirect combustion chamber 450 even if the air inlet temperature is too low to support combustion otherwise. The "hot mass" could be, e.g., a metal grid with a catalytic coating for aiding combustion.

The combustion chamber 450 is basically spherical in shape, but has two diametrically opposed inlet ducts 456,458 through which the turbocharging air 460 can pass when the inlet valves 440,442, respectively, are open. The inlet valves 440,442, are of the same size and shape and open the inlet ducts 456,458 by moving towards each other along a common axis of movement 462, the arrangement being such that when they are fully open they sandwich the hot mass 454 between them so that it is shielded from the chilling effect of the incoming turbocharging air 460, which then flows into the cylinder (not shown) through a passage 464 similar to passage 412 in FIG. 4. A fuel injector, indicated by an arrow 464, sprays fuel into the indirect combustion chamber 450 after the inlet valves have closed, as in FIGS. 10(b), and combustion occurs as for the previous embodiment. It will be understood that the double opposed inlet valves 440,442 give higher mass flow rates than is possible with only one inlet valve, and hence enable the expansion ratio of the cylinder to be raised to about 12.

Referring now to FIG. 11 and 12, there is shown a cylinder 500 with a cylinder head 501 similar to that shown in FIGS. 4 and 5, but incorporating the twin opposed inlet valves 440,442 and hot mass 454 of FIG. 10. Where the components are similar to those already described in relation to the Figures just mentioned, they have been given the same reference numerals and neither they nor their function will be described again. Items of note are that the hot mass 454 has been attached conveniently to the end of the heater 404 and that in order to provide the engine with a variable compression ratio, as mentioned in connection with FIG. 3, the indirect combustion chamber 502 has been provided with a contra piston 504 which can be moved in and out from the chamber 502 within the duct 506 in the directions of the arrows. The contra piston, of course, is effective to alter the compression ratio by varying the volume of the chamber 502.

I claim:

1. A turbocompounded 2-stroke piston engine having a cylinder head incorporating, for each cylinder of said piston engine, an indirect combustion chamber, inlet valve means for admitting turbocharging air to the cylinder, and exhaust valve means for exhausting combustion gases from the cylinder, the piston engine being adapted to perform an operating cycle, comprising a compression stroke and an expansion stroke, in which the expansion stroke expands the combustion gases to a pressure lower than the incoming turbocharging air, and in which scavenging of the combustion gases from the cylinder is facilitated by arranging that both the inlet valve means and the exhaust valve means are open at the same time during an early part of the compression stroke so as to purge the cylinder with turbocharging air during said early part of the compression stroke, whereby the cylinder has a compression ratio which is substantially less than its expansion ratio; wherein the inlet valve means is incorporated in the indirect combustion chamber such that when the inlet valve means is open, the incoming turbocharging air flows through the indirect combustion chamber before entering the cylinder, the indirect combustion chamber being connected to the cylinder by passage means for directing the incoming turbocharging air towards the piston thereby to displace the combustion gases towards the exhaust valve means and maximize the efficiency of said scavenging, said indirect combustion chamber incorporating two inlet valves disposed oppositely to each other across the indirect combustion chamber such that inlet obturating portions of the valves move towards each other when the valves are opened.

2. An engine according to claim 1 in which the passage means for directing the turbocharging air towards the pistons occupy a smaller portion of the cylinder head area then the exhaust valve means, thereby facilitating the scavenging process.

3. An engine according to claim 1 in which a heat retaining mass for assisting combustion is situated intermediate the two inlet valves such that it is shielded from the flow of the incoming turbocharging air, when the valves are open, by the inlet obturating portions of the valves.

4. An engine according to claims 1, 2 or 3 in which the indirect combustion chamber incorporates moveable piston means in the wall thereof, whereby the compression ratio of the engine can be varied.

5. A cylinder head for a turbocompounded 2-stroke piston engine, the cylinder head incorporating exhaust valve means, at least one indirect combustion chamber, passage means for connecting the indirect combustion chamber to a cylinder of the engine, and inlet valve means in the indirect combustion chamber for allowing turbocharging air to flow through said indirect combustion chamber and said passage means to the cylinder, said indirect combustion chamber being provided with two inlet valves disposed oppositely each other across the indirect combustion chamber such that inlet obturating portions of the valves move towards each other when the valves are open.

6. A cylinder head according to claim 5 in which the passage means is adapted to direct the incoming turbocharging air towards the piston so as to displace combustion gases towards the exhaust valve means.

7. A cylinder head according to claim 5 or claim 6 in which the passage means occupies a smaller portion of the cylinder head's area than the exhaust valve means.

8. A cylinder head according to claim 5 in which a heat retaining mass for assisting combustion is situated intermediate the two inlet valves and is shielded from the flow of the incoming turbocharging air by the inlet obturating portions of the inlet valves when the inlet valves are open.

9. A cylinder head according to 5, 6, or 8 claims having moveable piston means in the wall of the indirect combustion chamber, whereby the compression ratio of an engine to which the cylinder head is attached can be varied.

* * * * *